March 26, 1935.  C. W. SCHILD  1,995,946
BATTERY CONTROL OR SWITCH
Filed Feb. 19, 1934  2 Sheets-Sheet 1
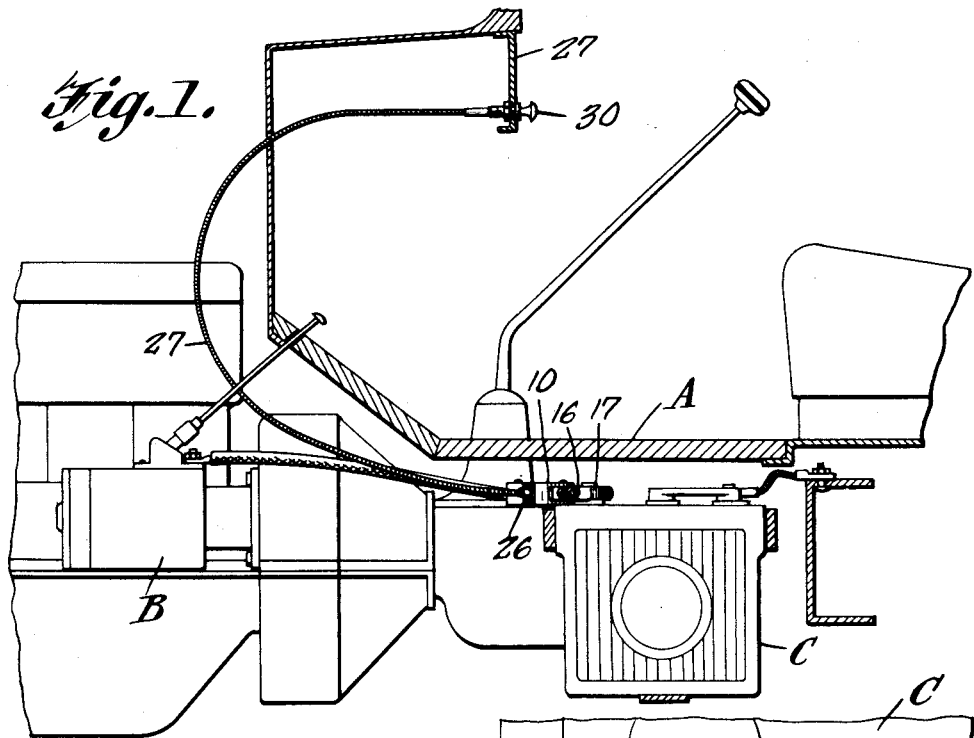
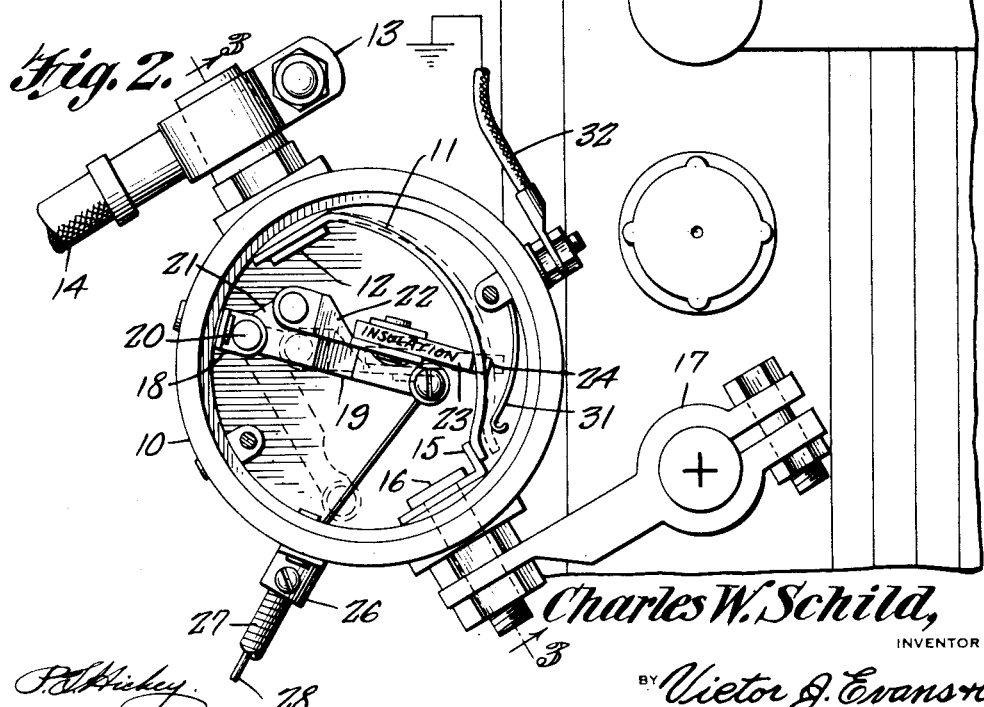
Charles W. Schild,
INVENTOR March 26, 1935.  C. W. SCHILD  1,995,946
BATTERY CONTROL OR SWITCH
Filed Feb. 19, 1934  2 Sheets-Sheet 2
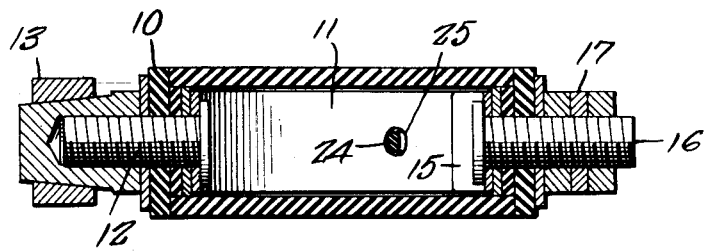
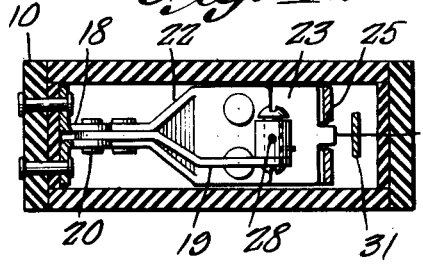
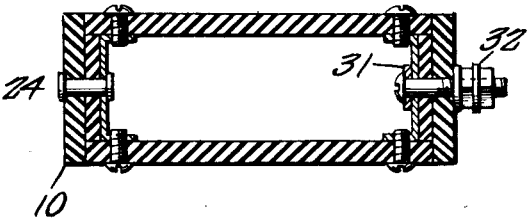
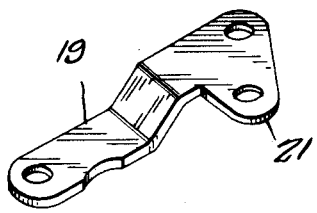
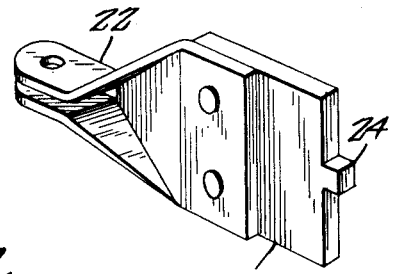
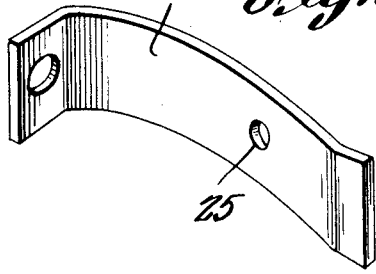
Charles W. Schild,
INVENTOR
BY Victor J. Evans & Co.
ATTORNEY
P. J. Hickey.
WITNESS:

Patented Mar. 26, 1935

1,995,946

UNITED STATES PATENT OFFICE 1,995,946

BATTERY CONTROL OR SWITCH

Charles W. Schild, Villa Park, Ill.

Application February 19, 1934, Serial No. 712,019

1 Claim. (Cl. 200—52)

The invention relates to a battery control or switch and particularly adapted for use in connection with storage or other batteries for automobiles or the like.

The primary object of the invention is the provision of a control or switch of this character, wherein the user or operator of an automobile can conveniently and with dispatch cut out the electric system from operation as may be installed in the automobile, to avoid current leakage and consequently drain upon the battery, especially when the vehicle is left standing and also to eliminate the possible theft of such vehicle, the control or switch being of novel construction.

Another object of the invention is the provision of a control or switch of this character, wherein the same can be mounted local to or upon an electric battery as arranged within a motor vehicle, so that the circuit including said battery can be opened or closed and the same conveniently managed by the operator or driver of the vehicle, the control or switch being constructed for manual operation and simple in its construction, thoroughly reliable and efficient in its purpose, readily and easily installed, and inexpensive to manufacture.

With these and other objects in view, the invention consists in the features of construction, combination and arrangement of parts as will be hereinafter more fully described in detail, illustrated in the accompanying drawings, which disclose the preferred embodiment of the invention, and pointed out in the claim hereinto appended.

In the accompanying drawings:

Figure 1 is a fragmentary vertical longitudinal sectional view through a motor vehicle showing the control or switch constructed in accordance with the invention arranged with relation to the storage battery, with the operating medium positioned conveniently for use of the operator or driver of the vehicle.

Figure 2 is an enlarged horizontal sectional view through the control or switch showing in detail the make-up of the same and the manner of assembly with respect to the battery and the electric system for an automobile.

Figure 3 is a sectional view on the line 3—3 of Figure 2 looking in the direction of the arrows.

Figure 4 is a vertical transverse sectional view taken substantially at an angle to the section in Figure 3.

Figure 5 is another vertical transverse sectional view through the control or switch.

Figure 6 is a perspective view of the throw lever of the switch or control.

Figure 7 is a perspective view of an arm operated by said lever.

Figure 8 is a perspective view of the switch blade.

Similar reference characters indicate corresponding parts throughout the several views in the drawings.

Referring to the drawings in detail, A designates generally a portion of the body of a motor vehicle or automobile, B the starter and C the electric storage battery, respectively, these being of conventional type and constituting no part of the present invention except for an illustration of the use of the control or switch hereinafter fully described.

The control or switch constituting the present invention comprises a circular shell or body 10 in which is arranged a resilient bowed switch blade 11, one end being fixed by a binding post 12 with which is engaged a terminal clamp 13 of the lead 14 connected with the starter B. The switch blade 11 is engageable with a contact 15 on a binding post 16, the same having fitted thereto the clamp 17 which is engaged with the positive pole of the battery C.

Fitted with the shell or body 10 is a bracket 18 constituting a pivot bearing for a swinging lever 19, the same being connected with the bracket or bearing by the pivot 20 for arcuate swinging movement. The lever 19 is formed with an angular offset 21 to which is pivoted a spreading arm 22 having fast thereto an insulating piece 23 provided with a nib 24, the latter engageable in a suitable hole 25 in the blade 11, so that on the swinging of the lever 19 in one direction the said blade 11 will be distorted for disengagement with the contact 15, thereby breaking the circuit of the electric system for the automobile from the battery C, the circuit being closed when the blade 11 engages the contact 15, as should be obvious.

Connected with the shell or body 10 at the proper locality by a coupling 26 is a conduit 27 housing a pull and push rod or wire 28, the conduit being suitably trained to the dash 29 of the body A of the motor vehicle and made fast to said dash in any suitable manner, while the rod or wire 28, which is of the flexible kind, as carried within the conduit has at its free end a hand knob 30 so that this wire or rod can be manually manipulated for a pull and push action and under such action the control or switch can be operated by separating the blade 11 from the contact 15 or the engagement of this blade with said contact for the opening and closing of the electric circuit for the motor vehicle.

Located within the shell or body 10, next to the switch blade 11, is a ground spring 31 with which is connected the ground wire 32 related with the frame of the motor vehicle, so that the back flow of current caused by a generator (not shown) in the electric system of the motor vehicle will be grounded through the ground wire 32 as the back flow will be effected by the contact of the blade 11 with the ground spring 31.

When it is desired to disconnect all the battery current from the motor vehicle it is only necessary to manually pull upon the knob 30 and through the instrumentality of the pull and push rod or wire 28 the blade 11 will be caused to break from the contact 15 and engage with the ground spring 31, thus grounding the back flow of current caused by the generator. The shifting lever 19 throws the arm 22 past center, thus locking the said lever 19 in a position by the spring resistance of the blade 11 and in this manner holding the said blade 11 engaged with the ground spring 31 so that the battery current will be shut off from the electric system for the motor vehicle.

It is needless to say that with the installation of the control or switch localized with respect to the battery C, safety is assured against fire resultant from short circuiting and current leakage out of the battery is avoided, as well as aiding mechanics when making repairs to the electric system, the generator and starter. When the motor vehicle equipped with the control or switch is parked and the battery cut out thereby it is impossible for a malicious person to waste current by the blowing of the horn or injury resultant from actuating the starter or the theft of the vehicle, the control or switch being beneficial for disconnecting current from the battery instantly when the vehicle gets out of control while driving.

What is claimed is:

A device of the kind described comprising a shell, couplings arranged opposite each other on said shell and one being adapted for engagement with a positive pole of a storage battery on the detachment of a lead to a starter therefrom, the other coupling being engageable with the said lead on said starter, a yieldable switch blade for normally bridging the space between said couplings and forming a connection therebetween, a swinging lever within the shell, a spread arm pivotally carried by and insulated from the lever to move the switch blade for disconnection between the couplings, the blade being formed with an aperture, a nib on the spread arm and fitting in the aperture and a remotely operated means controlling the said lever.

CHARLES W. SCHILD.